US010316137B2

(12) United States Patent
Wilker et al.

(10) Patent No.: US 10,316,137 B2
(45) Date of Patent: Jun. 11, 2019

(54) ADHESIVES FROM RENEWABLE FEEDSTOCKS

(71) Applicant: Purdue Research Foundation, West Lafayette, IN (US)

(72) Inventors: Jonathan James Wilker, Lafayette, IN (US); Courtney Lynn Jenkins, Jefferson City, MO (US)

(73) Assignee: Purdue Research Foundation, West Lafayette, IN (US)

( * ) Notice: Subject to any disclaimer, the term of this patent is extended or adjusted under 35 U.S.C. 154(b) by 107 days.

(21) Appl. No.: 15/552,429

(22) PCT Filed: Feb. 19, 2016

(86) PCT No.: PCT/US2016/018754
§ 371 (c)(1),
(2) Date: Aug. 21, 2017

(87) PCT Pub. No.: WO2016/134304
PCT Pub. Date: Aug. 25, 2016

(65) Prior Publication Data
US 2018/0044469 A1 Feb. 15, 2018

Related U.S. Application Data

(60) Provisional application No. 62/119,153, filed on Feb. 21, 2015.

(51) Int. Cl.
*C08G 63/06* (2006.01)
*C08G 63/91* (2006.01)
(Continued)

(52) U.S. Cl.
CPC ............ *C08G 63/06* (2013.01); *C08G 63/912* (2013.01); *C09J 167/04* (2013.01); *C09J 101/02* (2013.01);
(Continued)

(58) Field of Classification Search
CPC ...... C08G 63/06; C08G 63/912; C09J 167/04; C09J 101/02; C09J 103/02; C09J 105/08; C09J 105/14; C09J 189/00; C09J 193/04
See application file for complete search history.

(56) References Cited

U.S. PATENT DOCUMENTS

| 2009/0261510 A1* | 10/2009 | De Vos | C08L 67/04 264/322 |
| 2016/0060386 A1* | 3/2016 | Medoff | B01J 19/247 524/599 |
| 2016/0076062 A1* | 3/2016 | Medoff | C12P 7/46 562/589 |

OTHER PUBLICATIONS

Hagenau, et al., Nature as a blueprint for polymer material concepts: Protein fiber-reinforced composites as holdfasts of mussels. Progress in Polymer Science 39 (2014) 1564-1583.
(Continued)

*Primary Examiner* — Shane Fang
(74) *Attorney, Agent, or Firm* — Purdue Research Foundation; Liang Zeng Yan

(57) ABSTRACT

Poly[(3,4-dihydroxymandelic acid)-co-(lactic acid)] can be produced from renewable feedstocks, possesses tunable degradation, and can achieve adhesion strengths rivaling the performance of existing glues and adhesives. In one aspect, a polymer is presented. The polymer includes poly[(3,4-dihydroxymandelic acid)-co-(lactic acid)]. The polymer can be an adhesive. The adhesive is configured to have tunable degradation. The polymer is derived from renewable resources. The renewable resources can include any one of or a combination of starch, cellulose, hemicellulose, lignin, chitin, polyphenols, poly (isoprene), suberin, polyterpenes, polyterpenoids, polyhydroxyalkanoates, rosin-based polymers, triglyceride-based polymers, alginates, and/or proteins.

6 Claims, 5 Drawing Sheets

(51) Int. Cl.
- *C09J 101/02* (2006.01)
- *C09J 103/02* (2006.01)
- *C09J 105/08* (2006.01)
- *C09J 105/14* (2006.01)
- *C09J 167/04* (2006.01)
- *C09J 189/00* (2006.01)
- *C09J 193/04* (2006.01)

(52) U.S. Cl.
CPC ............ *C09J 103/02* (2013.01); *C09J 105/08* (2013.01); *C09J 105/14* (2013.01); *C09J 189/00* (2013.01); *C09J 193/04* (2013.01)

(56) References Cited

OTHER PUBLICATIONS

Murphy, et al., Adhesive Performance of Biomimetic Adhesive-Coated Biologic Scaffolds. Biomacromolecules 2010, 11, 2976-2984.

Meredith, et al., Enhancing the Adhesion of a Biomimetic Polymer Yields Performance Rivaling Commercial Glues. Adv. Funct. Mater 2014, 24, 3259-3267.

Ryu, et al., Catechol-Functionalized Chitosan/Pluronic Hydrogels for Tissue Adhesives and Hemostatic Materials. Biomacromolecules 2011, 12, 2653-2659.

Zhang, et al., Mussel-inspired hyperbranched poly(amino ester) polymer as strong wet tissue adhesive. Biomaterials 35(2014) 711-719.

Cha, et al., Bulk adhesive strength of recombinant hybrid mussel adhesive protein. Biofouling, vol. 25, No. 2, Feb. 2009, 99-107.

Shao, et al., Biomimetic Underwater Adhesives with Environmentally Triggered Setting Mechanisms. Adv. Mater. 2010, 22, 729-733.

Sedo, et al., Catechol-Based Biomimetic Functional Materials. adv. Mater. 2013, 25, 653-701.

Jenkins, et al., Molecular Weight Effects upon the Adhesive Bonding of a Mussel Mimetic Polymer. ACS Appl. Mater. Interfaces 2013, 5, 5091-5096.

Matos-Perez, et al., Polymer Composition and Substrate Influences on the Adhesive Bonding of a Biomimetic, Cross-Linking Polymer. J. Am. Chem. Soc. 2012, 134, 9498-9505.

* cited by examiner

ADHESIVES FROM RENEWABLE FEEDSTOCKS

CROSS-REFERENCE TO RELATED APPLICATIONS

The present U.S. patent application is a U.S. National Stage Application of PCT/US16/18754, filed Feb. 19, 2016, which related to and claims the priority benefit of U.S. Provisional Patent Application Ser. No. 62/119,153, filed Feb. 21, 2015, the contents of which are hereby incorporated by reference in their entirety into this disclosure.

STATEMENT OF GOVERNMENT INTEREST

This invention was made with government support under N000141310327 awarded by the Office of Naval Research. The government has certain rights in the invention.

TECHNICAL FIELD

The present disclosure generally relates to adhesives, and in particular to novel copolymers that can be produced from renewable feedstocks and can achieve adhesion strengths comparable to among the strongest adhesives currently available.

BACKGROUND

This section introduces aspects that may help facilitate a better understanding of the disclosure. Accordingly, these statements are to be read in this light and are not to be understood as admissions about what is or is not prior art.

We are constantly surrounded by toxic adhesives. The plywood in our walls, the chairs we sit on, and the carpet beneath our feet are all off-gassing reactive chemicals. With ~9 billion kilograms of glue manufactured annually in the United States, almost 4 billion kilograms contain formaldehyde. The permanent nature of most adhesives means that there are not practical ways to disassemble building materials, furniture, cars, or electronics for recycling. Almost all adhesives in current use are also petroleum-based. There is therefore an unmet need for renewable, nontoxic, and removable adhesives to decrease waste in landfills as well as our exposure to pollutants.

SUMMARY

In one aspect, a polymer is presented. The polymer includes poly[(3,4-dihydroxymandelic acid)-co-(lactic acid)]. The polymer can be an adhesive. The adhesive is configured to have tunable degradation. The polymer is derived from renewable resources. The renewable resources can include any one of or a combination of starch, cellulose, hemicellulose, lignin, chitin, polyphenols, poly(isoprene), suberin, polyterpenes, polyterpenoids, polyhydroxyalkanoates, rosin-based polymers, triglyceride-based polymers, alginates, and/or proteins.

In another aspect, a copolymer is presented. The copolymer can include a combination of an amount of lactic acid and an amount of methylenedioxy mandelic. The copolymer is capable of flowing into pores of materials.

In yet another aspect, a copolymer is presented, which includes poly[(3,4-dihydroxymandelic acid)-b-(lactic acid)]. The copolymer can be a block polymer. The copolymer can also be a random copolymer.

The copolymer can be a block polymer or a random copolymer. The polymers and copolymers are not toxic to cells. The polymers and copolymers exhibit cytocompatibility. The polymers and copolymers can be incorporated into any one of or a combination of biomedical adhesives, dental applications, coatings for cells, food products, and/or packaging applications.

In yet another aspect, a method of making a copolymer is presented, which includes reacting an amount of PLA with an amount of oligo(methylenedioxy mandelic acid) via a condensation polymerization reaction. The method can include deprotecting in situ to produce the copolymer.

DETAILED DESCRIPTION

Figure 1A:
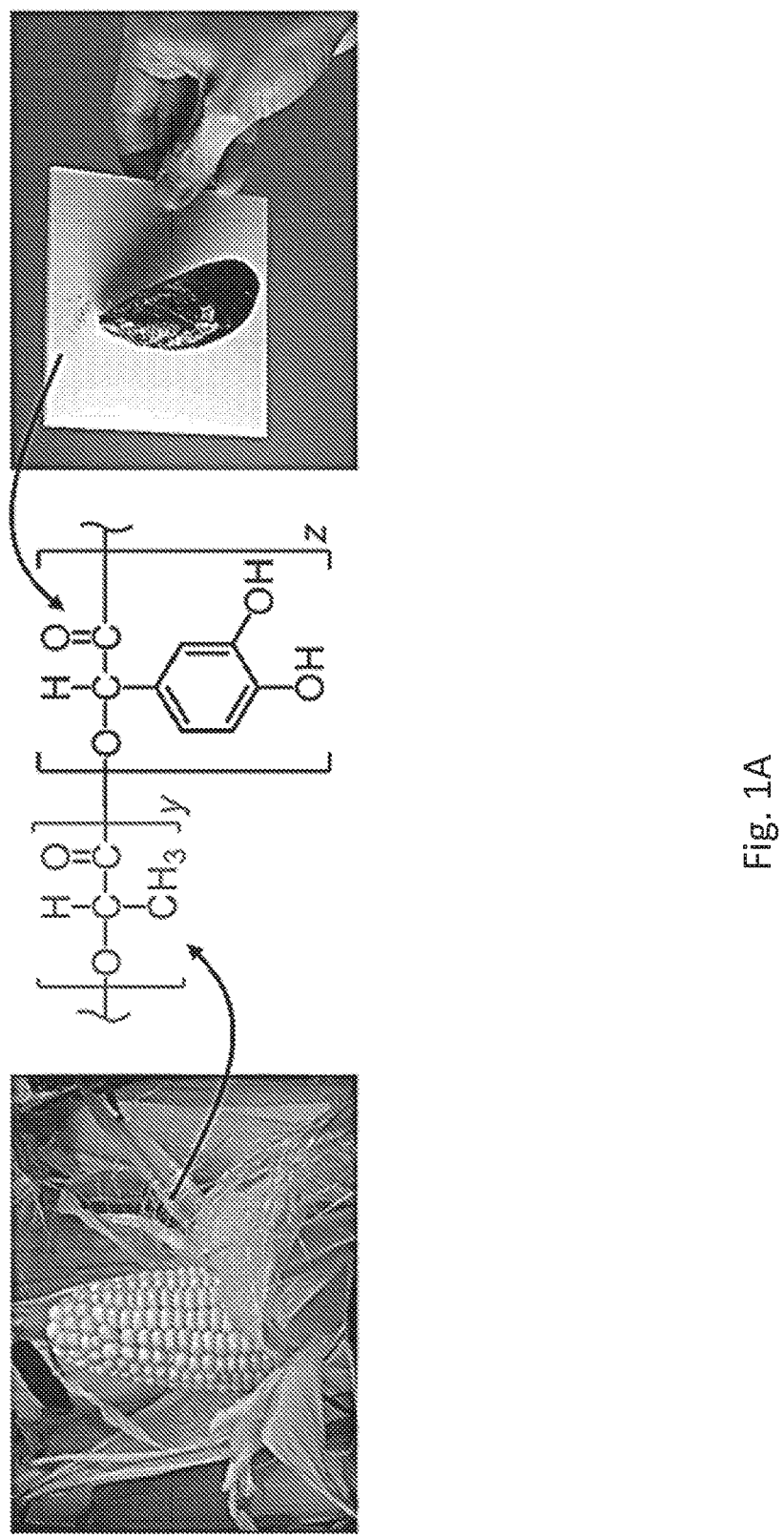
FIG. 1A is an illustration showing combining the renewability of poly(lactic acid), sourced from corn, with the adhesive chemistry of marine mussels into an adhesive copolymer system.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The need for renewably sourced and removable adhesives stems from a society awash in toxic, permanent, and petroleum-based glues. Herein we describe a biomimetic system that combines a plant-based polymer with adhesion chemistry from a shellfish. After establishing a synthetic route and exploring several polymer characteristics, bonding performance was able to compete with established commercial products. Control over adhesive joint degradation was brought about under mild conditions. This new system provides nontoxic materials sourced from nature, capable of being broken down into benign components, and enhanced recyclability of objects all around us. In addition, the materials and methods described herein result in products, polymers, and copolymers that are nontoxic to biological cells and also exhibit cytocompatibility. Such characteristics and benefits permit these materials to be applicable to fields that include but are not limited to biomedical adhesives, dental applications, coatings for cells, food products and packaging.

When considering how to design the next generation of adhesives marine biology presents compelling ideas. Mussels achieve strong bonding onto rocks with proteins that contain 3,4-dihydroxyphenylalanine (DOPA) for cross-linking and adhesion. Utilizing the catechol functionality of DOPA to develop synthetic materials is inspiring the emergence of exciting new materials. This mussel-mimetic chemistry has sparked the development of copolymer, polypeptide, and coacervate systems for hydrogels, coatings, and sensors. Integrating biomimetic chemistry into otherwise non-adhesive polymers such as polystyrene has generated systems able to outperform established commercial products including Super Glue.

Poly(lactic acid) (PLA) is a degradable and nontoxic polymer that can be sourced from corn. Combining the positive attributes of PLA and mussel adhesive may generate a new class of materials (FIG. 1A). Our experience, however, found that access to such copolymers was often thwarted by several synthetic challenges. Results presented herein show that such difficulties can be overcome to yield a promising new adhesive system derived from a renewable resource, displaying high strength bonding, and degrading in a controlled fashion.

There are several ways to integrate catechol groups into PLA. Experiments, nonetheless, prove otherwise. Seemingly logical synthetic routes to catechol-containing PLA copolymers were explored. Ring opening copolymerization with cyclic lactide and a DOPA mimic, combining lactic acid with DOPA via an acid chloride, and various combinations of monomers, dimers, or oligomers were all explored under multiple reaction conditions. Different protecting groups as well as not using any protecting groups were also attempted. Problems, however, arise with each of these routes including unwanted cross-linking reactions, insufficient molecular weights, and low yields.

Figure 1B:
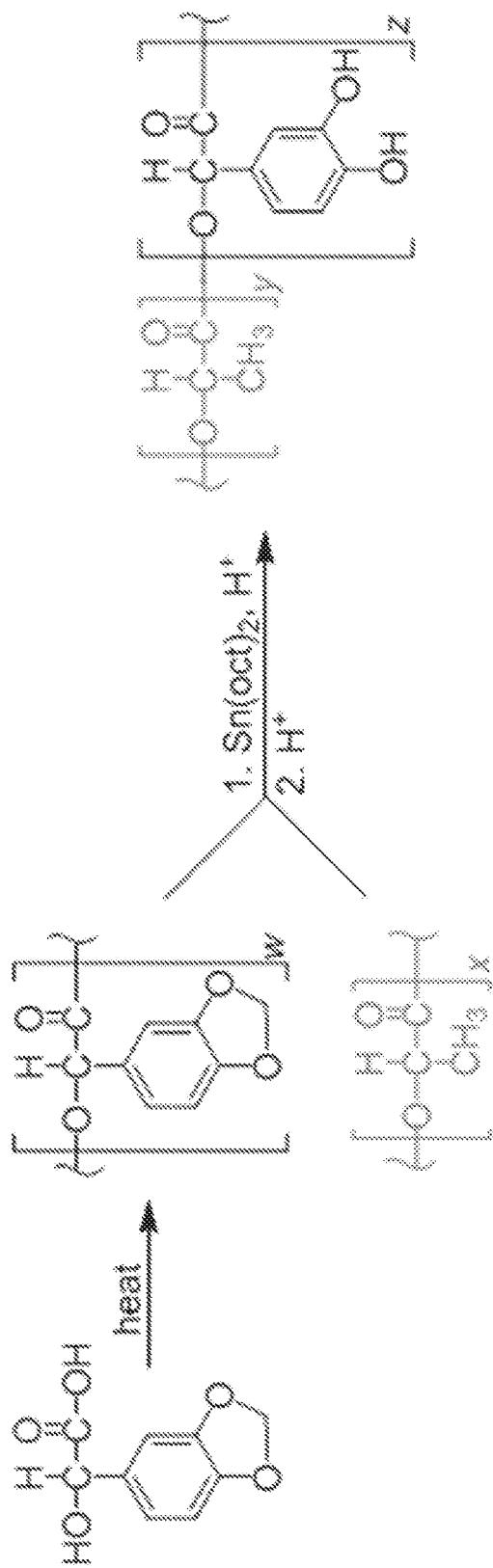
FIG. 1B shows a synthetic scheme showing the oligomerization of 3,4-methylenedioxymandelic acid, which is subsequently combined with poly(lactic acid) in a polycondensation reaction. Acid aids in the polymerization reaction while simultaneously deprotecting the pendant catechol to reveal poly[(3,4-dihydroxymandelic acid)-co-(lactic acid)] ("catechol-PLA").

A successful route to catechol-functionalized PLA is describe herein in FIG. 1B. The 3,4-methylenedioxymandelic acid monomer can be oligomerized and then melted into preformed poly(lactic acid) via a polycondensation reaction. Combining PLA with oligomerized 3,4-methylenedioxymandelic acid and a tin(II) 2-ethylhexanoate catalyst brought about both intermolecular and intramolecular transesterification. Chain rearrangements, scission, and reincorporation form the new random copolymer. The methylene protecting group was removed with acid to reveal the pendent catechol yielding poly[(3,4-dihydroxymandelic acid)-co-(lactic acid)] ("catechol-PLA"). Copolymers were characterized using proton nuclear magnetic resonance (1H NMR) spectroscopy for compositions, gel permeation chromatography (GPC) provided molecular weights, and differential scanning calorimetry (DSC) for thermal transitions showing random (not block) copolymers (Tables 1 and 2). It should be noted that although random copolymers are disclosed herein, such disclosure is not intended to be limiting, and block copolymers can apply as well to the methods and materials disclosed herein. This synthetic scheme proved to be quite flexible, permitting synthesis of varied molecular weights and ratios of PLA:catechol within the copolymers.

For determining the adhesive performance of catechol-PLA copolymers were dissolved into acetone, a common solvent for PLA. Joints were formed by depositing the copolymer solution between aluminum substrates overlapped in a typical lap shear configuration. Copolymer adhesion was tested both alone and when cross-linked with tetrabutylammonium periodate, [N(C4H9)4](IO4). This oxidant has been used with other biomimetic systems and was employed here at a 3:1 catechol:(IO4)-ratio to approximate the cross-linking found in mussel adhesive plaques.

TABLE 1

Synthesis and characterization data for poly[(3,4-dihydroxymandelic acid)-co-(lactic acid)]. These polymers were used for determining the effect of catechol content upon adhesion in FIG. 2A.

| feed o(3,4-mdMA) (mol %) | feed PLA (mol %) | PLA $M_w$ (g/mol) | final catechol content (%) | final lactic acid content (%) | $M_n$ (g/mol) | $M_w$ (g/mol) | PDI | $T_g$ (° C.) |
|---|---|---|---|---|---|---|---|---|
| 0 | a) | a) | 0 | 100 | 14,100 | 20,600 | 1.5 | 46 |
| 9 | 91 | 105,100 | 8 | 92 | 22,600 | 34,400 | 1.7 | 37, 56 |
| 20 | 80 | 105,100 | 15 | 85 | 25,200 | 33,000 | 1.3 | 33, 62 |
| 30 | 70 | 44,200 | 20 | 80 | 10,300 | 12,300 | 1.2 | 96 |
| 30 | 70 | 105,100 | 23 | 77 | 16,600 | 25,500 | 1.5 | 35, 87 |
| 40 | 60 | 105,100 | 30 | 70 | 23,500 | 34,400 | 1.5 | 30, 81 |
| 60 | 40 | 105,100 | 49 | 51 | 15,900 | 27,200 | 1.7 | 33, 85 |

TABLE 2

Synthesis and characterization data for poly[(3,4-dihydroxymandelic acid)-co-(lactic acid)]. These copolymers were used to investigate the effect of molecular weight upon adhesion in FIG. 2B.

| feed o(3,4-mdMA) (mol %) | feed PLA (mol %) | PLA $M_w$ (g/mol) | final catechol content (%) | final lactic acid content (%) | $M_n$ (g/mol) | $M_w$ (g/mol) | PDI | $T_g$ (° C.) |
|---|---|---|---|---|---|---|---|---|
| 9 | 91 | 105,100 | 8 | 92 | 1,500 | 2,700 | 1.8 | 48 |
| 10 | 90 | 105,100 | 8 | 92 | 3,000 | 8,500 | 2.9 | 42 |
| 9 | 91 | 105,100 | 7 | 93 | 3,000 | 11,800 | 3.9 | 43, 65 |
| 11 | 89 | 62,900 | 7 | 93 | 5,600 | 9,400 | 1.7 | 72 |
| 9 | 91 | 105,100 | 8 | 92 | 23,500 | 34,400 | 1.8 | 43, 71 |
| 9 | 91 | 105,100 | 6 | 94 | 31,100 | 39,500 | 1.8 | 37, 56 |
| 9 | 91 | 105,100 | 6 | 94 | 57,200 | 72,200 | 1.3 | 78 |

Predicting the ideal copolymer to yield the strongest bonding is not straightforward. Mussel adhesive plaques are made of six different proteins with a range of molecular weights (6,000-110,000 grams/mole) and DOPA contents (2-30% of all amino acids). Prior work with catechol-containing copolymers has shown that modulating the molecular weight and catechol content can both impact adhesion significantly. Consequently, we examined how altering the ratio of lactic acid to catechol-containing monomer and also the copolymer molecular weight would influence performance.

Catechol content can be controlled by altering the PLA to 3,4-methylenedioxymandelic acid ratio in the starting polymerization feed. A range of 0 to 49 mole percent 3,4-dihydroxymandelic acid was incorporated into the PLA host polymer, with the remainder being lactic acid (Table 1). For these studies similar molecular weights were maintained at ~12,000 to ~34,000 grams/mole.

Figure 2B:
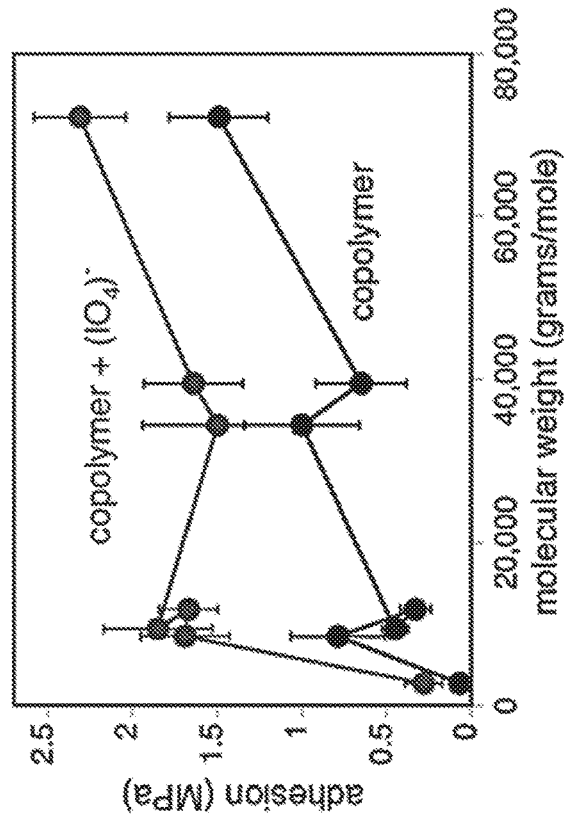
FIG. 2B is a plot showing the influence of polymer molecular weight upon adhesion. These copolymers were composed of ~7% 3,4-dihydroxymandelic acid and ~93% lactic acid.
Figure 2A:
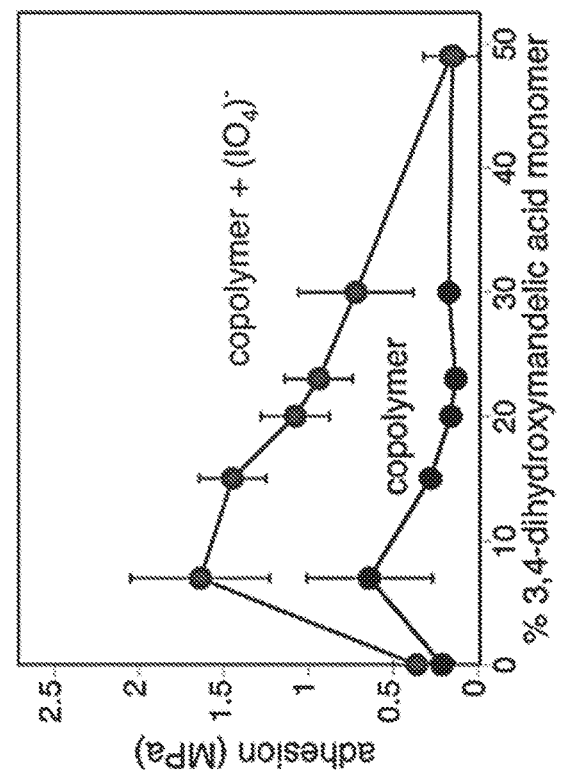
FIG. 2A is a plot showing the effect of copolymer composition on lap shear adhesion strength of poly[(3,4-dihydroxymandelic acid)0-49%-co-(lactic acid)51-100%] was examined. The percent of catechol-containing monomer 3,4-dihydroxymandelic acid was varied with lactic acid comprising the remainder of the copolymer. Molecular weights of each polymer were in the range of ~12,000 to ~34,000 grams/mole.

Data in FIG. 2A reveal that the strongest adhesion was derived from a cross-linked copolymer composed of ~7 mole percent of 3,4-dihydroxymandelic acid and ~93% lactic acid. This unexpected result contrasts with prior work on a polystyrene-based system in which ~33% of the catechol-containing monomer yielded the highest performance. Needing so little catechol for the highest adhesion may be a result of enhanced interchain interactions within PLA versus polystyrene. Dipole-dipole attractions between the polyester backbones as well as hydrogen bonding with catechols may enhance cohesive forces. Such interactions may also take place between copolymer and substrate to provide some degree of surface adhesive forces.

Generally speaking, low molecular weight species have higher mobility and provide wetting for enhanced surface interactions. Higher molecular weights bring about chain entanglements that contribute to cohesive bonding. Strong bulk adhesion depends upon achieving a proper balance of both surface adhesive and bulk cohesive interactions. Several copolymers of varied molecular weights were made by altering the ratio of tin catalyst to 3,4-methylenedioxymandelic acid oligomer and PLA as well as varying the starting molecular weight of PLA (Table 2). In each case the catechol-containing monomer remained at ~7%. Molecular weights were examined up to ~72,000 grams/mole, the highest value attainable with this synthetic method. Data in FIG. 2B show that, for both copolymer alone and when cross-linked, higher molecular weights provided the strongest adhesion.

Adhesive bonding of this new biomimetic copolymer was benchmarked against several commercial systems: two classic, petroleum-based products (Elmer's Glue, Gorilla Glue), two bio-based adhesives (Titebond Liquid Hide Glue, Lineco Wheat Starch Glue), and a 100% PLA control (no catechol). All systems were tested under the same conditions of quantity, cure time, cure temperature, overlap area, and substrate. Table 3 shows that the biomimetic copolymer of 6% 3,4-dihydroxymandelic acid and molecular weight at ~72,000 grams/mole exhibited similar strength to petroleum-based Elmer's Glue (polyvinyl acetate) and Gorilla Glue (polyurethane) as well as starch glue. Hide glue and the unmodified PLA control were weakest. These results demonstrate that this biomimetic approach to materials design can already compete with commercial systems that have benefited from decades of optimization.

TABLE 3

Adhesion of catechol-PLA compared to commercial glues.

| Adhesive | Adhesion (MPa) in air | Adhesion (MPa) in buffer for 24 hours |
|---|---|---|
| Elmer's Glue (polyvinyl acetate) | 3 ± 1 | 0 |
| Gorilla Glue (polyurethane) | 2.8 ± 0.7 | 2.5 ± 0.8 |
| Starch glue | 2.4 ± 0.4 | 0 |
| Hide glue | 0.8 ± 0.1 | 0 |
| Poly(lactic acid) | 0.21 ± 0.06 | 0.10 ± 0.05 |
| Biomimetic copolymer [catechol$_{6\%}$-PLA$_{94\%}$ + (IO$_4$)$^-$] | 2.6 ± 0.4 | 1.0 ± 0.3 |

Bonds were lap shear joints between two pieces of aluminum and cured for 24 hours at 37° C., either tested immediately (middle column) or then submerged into buffer for 24 hours and measured.

To provide a view on versatility of this biomimetic system, bonding was tested with steel and Teflon substrates (Table 4). Here, too, adhesion was comparable to commercial systems. On steel catechol-PLA achieved a similar strength to Elmer's Glue, Gorilla Glue, starch glue, and hide glue. Performance of catechol-PLA on Teflon was quite appreciable, being higher than all of the commercial products.

TABLE 4

Adhesion strength of catechol-PLA bonding different substrates in air.

| | aluminum (MPa) | sanded steel (MPa) | Teflon (MPa) |
|---|---|---|---|
| Elmer's Glue (polyvinyl acetate) | 3 ± 1 | 1.6 ± 0.6 | 0.23 ± 0.04 |

TABLE 4-continued

Adhesion strength of catechol-PLA bonding different substrates in air.

| | aluminum (MPa) | sanded steel (MPa) | Teflon (MPa) |
|---|---|---|---|
| Gorilla Glue (polyurethane) | 2.8 ± 0.7 | 1.7 ± 0.3 | <0.07 ± 0.02 |
| Starch glue | 2.4 ± 0.4 | 2.0 ± 0.3 | <0.09 ± 0.04 |
| Hide glue | 0.8 ± 0.1 | 1.2 ± 0.4 | 0.12 ± 0.06 |
| Poly(lactic acid) | 0.21 ± 0.06 | 0.21 ± 0.05 | 0.10 ± 0.03 |
| Biomimetic copolymer [catechol$_{6\%}$-PLA$_{94\%}$ + (IO$_4$)$^-$] | 2.6 ± 0.4 | 1.7 ± 0.5 | 0.32 ± 0.05 |

From an environmental perspective we sought to reduce the organic solvent content of the glue formulation. Alone, PLA is not soluble in water. However, the addition of catechols increased solubility to the point that a copolymer comprised of ~50% 3,4-dihydroxymandelic acid and ~50% lactic acid would dissolve in water upon addition of 5% sodium dodecyl sulfate, a common surfactant. The 6% 3,4-dihydroxymandelic acid, 94% lactic acid copolymer dissolved readily in a 1:3 water:acetone ratio solvent. Interestingly enough, increasing the water content of this solvent system did not decrease performance. Adhesion for this copolymer when dissolved in pure acetone and used to join aluminum was 2.3±0.3 MPa versus 2.6±0.4 MPa in 1:3 water:acetone.

With hydrolytic degradation being a hallmark of PLA, we examined how this new copolymer might break apart. Custom molds were used to fabricate cylindrical samples of poly[(3,4-dihydroxymandelic acid)30%-co-(lactic acid)70%] (Mw≈23,000 grams/mole) alone and cross-linked with tetrabutylammonium periodate as well as a PLA control (no catechol, Mw≈18,000 grams/mole, FIG. 3A). This composition was chosen owing to prior work showing strong adhesion with ~30% catechol copolymers. Samples were placed in phosphate buffered saline (PBS) at 37° C. with daily buffer changes until pH stabilized at 7.4. Polymers were removed at varied time points to measure mass loss and examine morphological changes.

The copolymers alone underwent the most rapid changes. Catechols may have increased hydrophilicity relative to PLA, thus bringing about increased water absorption and relatively rapid hydrolysis. Pure PLA is known to undergo autocatalytic degradation, caused by hydrolyzed lactic acid groups, which increase the rate of mass loss. The day 2 copolymer samples were hollowed out, seen in FIG. 3A, indicating such accelerated degradation. Much slower to degrade were the copolymers cross-linked with periodate. This decrease in hydrolysis kinetics permitted the persistence of shape over a much longer period of time.

Figure 3A:
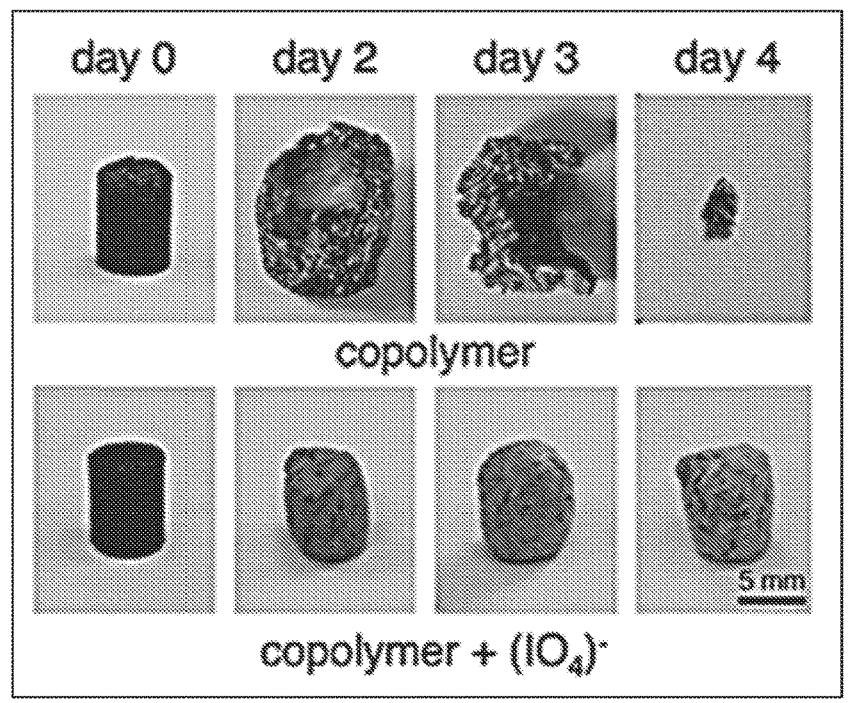
FIG. 3A shows cylindrical samples of poly[(3,4-dihydroxymandelic acid)30%-co-(lactic acid)70%] (Mw≈23,000 grams/mole) with and without periodate cross-linking. These images show how the material changed after residing in buffered water.
Figure 3B:
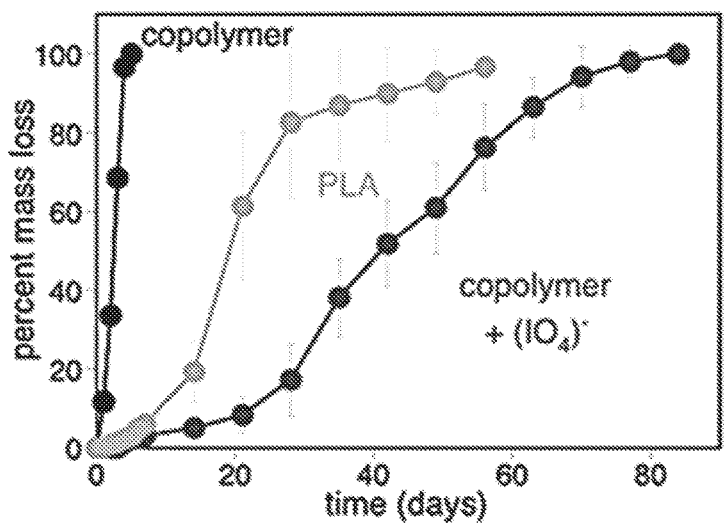
FIG. 3B is a plot showing mass loss of the same copolymer alone, when cross-linked, and with an unmodified PLA control over time when submerged in buffer. At least three samples were averaged for each point.

On average, the PLA controls took 70 days to degrade completely. A majority of the material, however, was gone after 21 days (FIG. 3B). Catechol-PLA alone degraded more rapidly than PLA, taking only 5 days to disappear. The cross-linked samples persisted substantially longer, lasting up to 84 days. When the copolymer was cross-linked, greater than 50% of mass was retained until about day 42, twice as long as the PLA control. These results demonstrate that incorporation of catechol chemistry enables the tailoring of degradation rates to be either faster or slower than common PLA.

Both catechol-PLA and several commercial adhesives were examined for adhesive bond degradation when submerged underwater (Table 3). Aluminum substrates were bonded together in air and cured fully prior to being submerged in phosphate buffered saline. After residing in an aqueous solution for 24 hours, starch, hide, and Elmer's Glue all dissolved completely, leaving no material left to connect the substrates. Samples could not even be picked up for testing without falling apart. Gorilla Glue lost no strength compared to dry conditions, consistent with the permanent nature of this material. The biomimetic copolymer can still maintain high strength adhesion after 24 hours in water, albeit at a lower value than when dry.

Figure 3C:
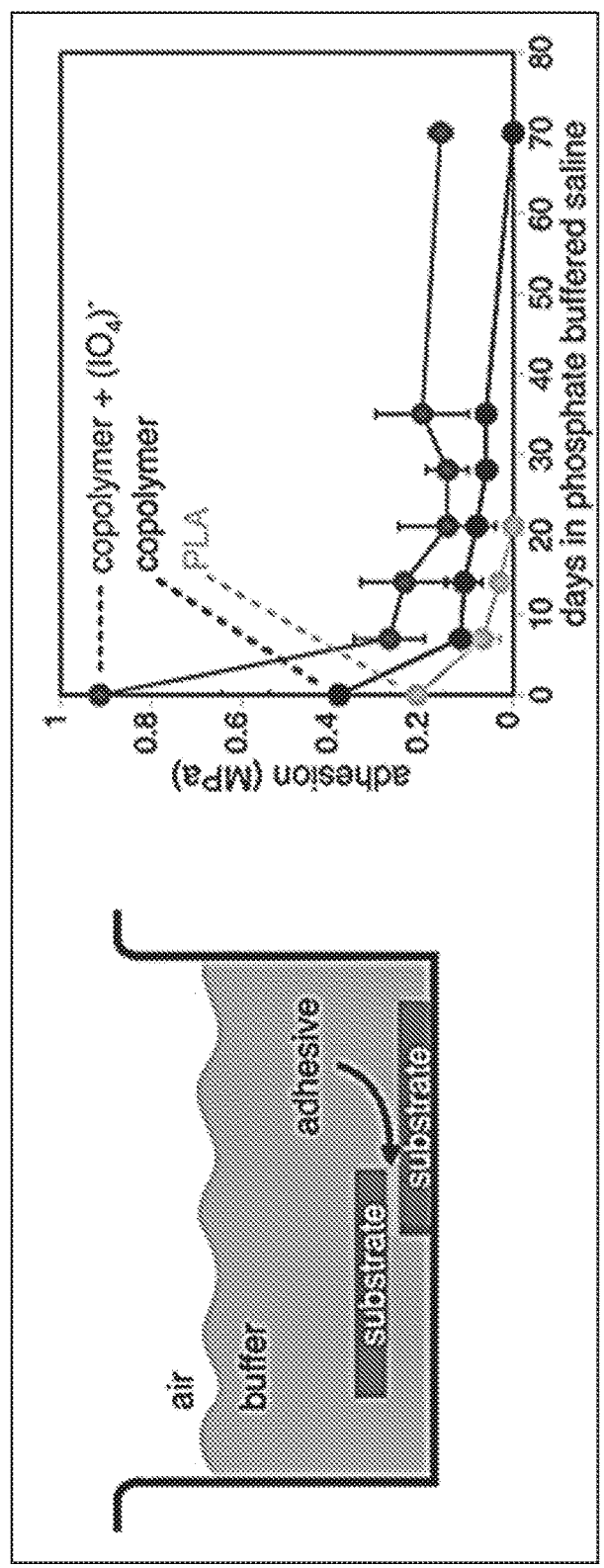
FIG. 3C shows bond strengths of lap shear joints between two aluminum substrates cured in air and then after varied amounts of time stored in buffered water. The adhesives used were poly[(3,4-dihydroxymandelic acid)30%-co-(lactic acid)70%] (Mw≈54,000 grams/mole) alone, this copolymer cross-linked with periodate, and an unmodified PLA control.

Given the pressing need for degradable glues, data were collected to describe the rate of adhesive joint strength losses. Aluminum substrates were bonded together in air using poly[(3,4-dihydroxymandelic acid)30%-co-(lactic acid)70%] (Mw≈54,000 grams/mole) alone and also cross-linked with tetrabutylammonium periodate. This polymer was chosen for consistency with the hydrolysis studies of FIGS. 3A and 3B. Unmodified PLA provided controls. Bonded pairs were submerged in pH=7.4 phosphate buffered solution at 37° C. and removed at several time points to assess the persisting adhesion (FIG. 3C).

The PLA control adhered only weakly in the beginning and degradation occurred relatively quickly. A complete loss of adhesion was found by week 3 (FIG. 3C). Samples glued together with catechol-PLA lasted longer, maintaining adhesion through week 5. When cross-linked with periodate the copolymer remained bonded for the longest time, even beyond 10 weeks of testing. These results of bonding persistence of the biomimetic copolymer are consistent with degradation analysis of bulk samples (FIG. 3A). Here, too, the rate at which materials properties change can be controlled.

Aluminum substrates were also bound with poly[(3,4-dihydroxymandelic acid)30%-co-(lactic acid)70%] (Mw≈54,000 grams/mole) and stored in dry, ambient conditions for 30 weeks. No loss of adhesion strength was found for catechol-PLA over this period. These results show that an adhesive can maintain bond strength when in air, then be debonded when desired and at a controllable rate.

EXPERIMENTAL

Synthesis and Characterization:

To synthesize the copolymers of interest, poly(lactic acid) (PLA) was obtained from Akina Incorporated. Monomeric 3,4-(methylenedioxy)mandelic acid was purchased from Santa Cruz Biotechnology. The tetrabutylammonium periodate, [N(C4H9)4](IO4), cross-linker was synthesized using an established protocol (31). Ultraviolet-visible absorption spectroscopy, 1H NMR spectroscopy, and melting point determinations confirmed the product. Additional materials were obtained from Sigma Aldrich and Fisher Scientific.

Oligomerization of 3,4-(methylenedioxy)mandelic acid was conducted by heating the monomer at 150° C. under vacuum until melted into a brown, viscous liquid. High temperatures were maintained for 3 hours at reduced pressure to aid removal of water. This condensation reaction yielded oligomers with 3 to 4 repeat units, determined by gel permeation chromatography (GPC). Oligo(3,4-methylenedioxymandelic acid) and PLA were melted together at 150° C. before adding the tin(II) 2-ethylhexanoate (Sn(oct)2) catalyst (0.5-2.5 weight %) and p-toluenesulfonic acid (TSA) cocatalyst (1:1 molar Sn(oct)2:TSA). This melt polycondensation took place for 2 hours under reduced pressure via vacuum before adding additional TSA (10 weight %). The reaction proceeded for an additional 1 hour under argon to complete the polymerization and remove the methylene protecting group to reveal the catechol-functionalized poly [(3,4-dihydroxymandelic acid)-co-(lactic acid)] ("catechol-PLA") (FIG. 1). The PLA homopolymers containing no catechol were made by performing a ring opening polymerization with lactide catalyzed by 2 weight % Sn(oct)2 with equimolar TSA cocatalyst.

Polymers were characterized by 1H NMR spectroscopy in acetone-d6 on a Varian Inova-300 MHz spectrometer. Removal of the methylene protecting groups was evident by a color change when in acetone from light orange-brown to black upon the addition of Fe(NO3)3. Molecular weights were determined by GPC using a Polymer Laboratories PL-GPC20 with tetrahydrofuran mobile phase and polystyrene standards to calibrate the instrument. Differential scanning calorimetry (DSC) was used to find the polymer glass transition temperatures (Tg's) and determine random versus block incorporation of 3,4-dihydroxymandelic acid into the PLA backbone.

Adhesion Studies:

Adhesion testing was conducted on 6061-T6 aluminum substrates purchased from Farmer's Copper, cut into 8.9×1.2×0.3 cm rectangles and cleaned using the ASTM D2651-01 standard method (32). The cleaning procedure involved degreasing the metal substrates initially using trichloroethylene followed by washes in base and acid. Samples were rinsed with methanol and boiling water to remove residual iron contained in the acid bath.

Polymer samples were dissolved in acetone at 0.3 grams/mL. An overlap area of 1.2×1.2 cm between substrates in lap shear configuration was covered with 45 µL of the polymer solutions. For cross-linked samples, 15 µL tetrabutylammonium periodate dissolved in acetone was then added at a 3:1 catechol:[N(C4H9)4] (IO4) ratio. Aluminum substrates were overlapped and allowed to set for 30 minutes at room temperature before curing at 37° C. for 22 hours. Samples were then cooled to room temperature for 30 minutes. Lap shear testing was conducted at 2 mm/min crosshead speed following a modified ASTM D1002 standard method using an Instron 5544 Materials Testing System (25, 33). The maximum force at point of failure was measured and divided by the substrate overlap area to determine adhesion strengths. Error bars indicate 95% confidence intervals determined by averaging 10 samples in the case of all dry adhesion testing.

Adhesion was also examined on sanded steel and poly (tetrafluoroethylene) (Teflon), purchased and prepared by a method described previously. Commercial adhesives were tested on each substrate for reference points including Elmer's Glue, Gorilla Glue, Titebond Hide Glue, and Lineco Wheat Starch Glue. To keep conditions consistent, the same quantity and curing were implemented for each material.

Hydrolytic Degradation:

Cylindrical molds were made out of polydimethylsiloxane. Degradation samples were solvent cast into these molds yielding ~250 mg cylindrical polymer monoliths of ~7 mm height and ~6 mm diameter (FIG. 3A). The copolymer alone samples were dark brown and became almost black when cross-linked with [N(C4H9)4](IO4). Each sample was submerged in phosphate buffered saline (PBS) with a pH of 7.4 and stored at 37° C. Degradation was assessed by mass loss of the polymer over time. Samples were removed from PBS and dried under reduced pressure for 3 hours before obtaining the dry mass. Measurements were taken every 24 hours for the first 7 days and weekly thereafter. Data were repeated in triplicate. The average dry mass was plotted as a function of time.

Polymer degradation was also assessed by the loss of bond strength over time. Adhesion testing on aluminum substrates was set up and cured in a manner similar to that described above. Bonded samples were then submerged in pH 7.4 PBS at 37° C. The water baths were changed if the pH dropped below 7.0. Bond areas were rinsed with deionized water before testing to remove any salt along the bond line. Trials were tested after 24 hours, daily for 7 days, and then weekly for 10 weeks or until no material remained bound at a given time point. Each sample was measured at least 5 times and averaged.

Those skilled in the art will recognize that numerous modifications can be made to the specific implementations described above. The implementations should not be limited to the particular limitations described. Other implementations may be possible. In addition, all references cited herein are indicative of the level of skill in the art and are hereby incorporated by reference in their entirety.

REFERENCES

1. V. Pocius, *Adhesion and Adhesives Technology: An Introduction*. (Hanser Publications, Cincinnati, Ohio, ed. 3, 2012).
2. S. Ebnesajjad, *Handbook of Biopolymers and Biodegradable Plastics*. (Elsevier Inc., Waltham, Mass., 2013).
3. A. Hagenau, M. H. Suhre, T. R. Scheibel, Nature as a blueprint for polymer material concepts: Protein fiber-reinforced composites as holdfasts of mussels. *Prog. Poly. Sci.* 39, 1564-1583 (2014).
4. J. L. Murphy, L. Vollenweider, F. M. Xu, B. P. Lee, Adhesive performance of biomimetic adhesive-coated biologic scaffolds. *Biomacromolecules* 11, 2976-2984 (2010).
5. H. J. Meredith, C. L. Jenkins, J. J. Wilker, Enhancing the adhesion of a biomimetic polymer yields performance rivaling commercial glues. *Adv. Funct. Mater.* 24, 3259-3267 (2014).
6. J. H. Ryu et al., Catechol-functionalized chitosan/pluronic hydrogels for tissue adhesives and hemostatic materials. *Biomacromolecules* 12, 2653-2659 (2011).
7. C. E. Brubaker, H. Kissler, L. J. Wang, D. B. Kaufman, P. B. Messersmith, Biological performance of mussel-inspired adhesive in extrahepatic islet transplantation. *Biomaterials* 31, 420-427 (2010).
8. H. Zhang et al., Mussel-inspired hyperbranched poly (amino ester) polymer as strong wet tissue adhesive. *Biomaterials* 35, 711-719 (2014).
9. B. J. Sparks, E. F. T. Hoff, L. P. Hayes, D. L. Patton, Mussel-inspired thiol-ene polymer networks: Influencing network properties and adhesion with catechol functionality. *Chem. Mater.* 24, 3633-3642 (2012).
10. P. Glass, H. Y. Chung, N. R. Washburn, M. Sitti, Enhanced reversible adhesion of dopamine methacrylamide-coated elastomer microfibrillar structures under wet conditions. *Langmuir* 25, 6607-6612 (2009).
11. H. J. Cha et al., Bulk adhesive strength of recombinant hybrid mussel adhesive protein. *Biofouling* 25, 99-107 (2009).
12. M. E. Yu, T. J. Deming, Synthetic polypeptide mimics of marine adhesives. *Macromolecules* 31, 4739-4745 (1998).
13. H. Tatehata, A. Mochizuki, T. Kawashima, S. Yamashita, H. Yamamoto, Model polypeptide of mussel adhesive protein. I. Synthesis and adhesive studies of sequential polypeptides (X-Tyr-Lys)(n) and (Y-Lys)(n). *J. Appl. Polym. Sci.* 76, 929-937 (2000).

14. D. S. Hwang, H. J. Yoo, J. H. Jun, W. K. Moon, H. J. Cha, Expression of functional recombinant mussel adhesive protein Mgfp-5 in *Escherichia coli*. *Appl. Environ. Microb.* 70, 3352-3359 (2004).
15. H. Shao, R. J. Stewart, Biomimetic underwater adhesives with environmentally triggered setting mechanisms. *Adv. Mater.* 22, 729-733 (2010).
16. J. Sedó, J. Saiz-Poseu, F. Busqué, D. Ruiz-Molina, Catechol-based biomimetic functional materials. *Adv. Mater.* 25, 653-701 (2013).
17. S. Moulay, Polymers with dihydroxy/dialkoxybenzene moieties. *C. R. Chim.* 12, 577-601 (2009).
18. E. Faure et al., Catechols as versatile platforms in polymer chemistry. *Prog. Poly. Sci.* 38, 236-270 (2013).
19. K. A. Athanasiou, G. G. Niederauer, C. M. Agrawal, Sterilization, toxicity, biocompatibility and clinical applications of polylactic acid polyglycolic acid copolymers. *Biomaterials* 17, 93-102 (1996).
20. T. Mekonnen, P. Mussone, H. Khalil, D. Bressler, Progress in bio-based plastics and plasticizing modifications. *J. Mater. Chem. A* 1, 13379-13398 (2013).
21. R. E. Drumright, P. R. Gruber, D. E. Henton, Polylactic acid technology. *Adv. Mater.* 12, 1841-1846 (2000).
22. O. Dechy-Cabaret, B. Martin-Vaca, D. Bourissou, Controlled ring-opening polymerization of lactide and glycolide. *Chem. Rev.* 104, 6147-6176 (2004).
23. M. Rissanen, A. Puolakka, P. Nousiainen, M. Kellomaki, V. Ella, Solubility and phase separation of poly(L,D-lactide) copolymers. *J. Appl. Polym. Sci.* 110, 2399-2404 (2008).
24. C. L. Jenkins, H. J. Meredith, J. J. Wilker, Molecular weight effects upon the adhesive bonding of a mussel mimetic polymer. *ACS Appl. Mater. Inter.* 5, 5091-5096 (2013).
25. C. R. Matos-Pérez, J. D. White, J. J. Wilker, Polymer composition and substrate influences on the adhesive bonding of a biomimetic, cross-linking polymer. *J. Am. Chem. Soc.* 134, 9498-9505 (2012).
26. B. P. Lee, J. L. Dalsin, P. B. Messersmith, Synthesis and gelation of DOPA-modified poly(ethylene glycol) hydrogels. *Biomacromolecules* 3, 1038-1047 (2002).
27. J. J. Wilker, Marine bioinorganic materials: mussels pumping iron. *Curr. Opin. Chem. Biol.* 14, 276-283 (2010).
28. Q. Lin et al., Adhesion mechanisms of the mussel foot proteins mfp-1 and mfp-3. *Proc. Natl. Acad. Sci. USA* 104, 3782-3786 (2007).
29. L. E. Nielsen, R. F. Landel, *Mechanical Properties of Polymers and Composites*. (M. Dekker, New York, ed. 2, 1994).
30. S. M. Li, H. Garreau, M. Vert, Structure property relationships in the case of the degradation of massive aliphatic poly-(α-hydroxy acids) in aqueous media, 1. Poly(DL-lactic acid). *J. Mater. Sci. Mater. Med.* 1, 123-130 (1990).
31. E. Santaniello, A Manzocchi, C. Farachi, Tetrabutylammonium periodate—A selective and versatile oxidant for organic substrates. *Synth. Stuttgart,* 563-565 (1980).
32. American Society for Testing and Materials (ASTM) Standard D2651, Preparation of metal surfaces for adhesive bonding. (ASTM International, West Conshohocken, Pa. 2008).
33. American Society for Testing and Materials (ASTM) Standard D1002-10, Apparent shear strength of single-lap-joint adhesively bonded metal specimens by tension loading (metal-to-metal). (ASTM International, West Conshohocken, Pa., 2010).

The invention claimed is:

1. A process for preparing a biomimetic polymer comprising the steps of
   a. heating 3,4-(methylenedioxy)mandelic acid to afford an oligomer thereof;
   b. preparing polylactic acid (PLA) from a renewable resource;
   c. melting PLA and oligomer of 3,4-(methylenedioxy) mandelic acid at an elevated temperature in the presence of tin(II) 2-ethylhexanoate and a strong acid at a molar ratio of about 1:1 under reduced pressure; and
   d. removing methylene moiety of phenolic hydroxyl protection using a strong acid to afford said biomimetic polymer, wherein said strong acid used to remove methylene protection is p-toluenesulfonic acid in an amount of about 10% weight of reaction mixture.

2. The process of claim 1, wherein said biomimetic polymer is poly[(3,4-dihydroxymandelic acid)-co-(lactic acid)].

3. The process of claim 2, wherein biomimetic polymer is an adhesive.

4. The process of claim 1, wherein said oligomer of 3,4-(methylenedioxy)mandelic acid comprises about four monomer units.

5. The process of claim 1, wherein said strong acid is p-toluenesulfonic acid (TSA).

6. The process of claim 1, wherein said natural resource is selected from the group consisting of starch, cellulose, hemicellulose, lignin, chitin, polyphenols, suberin, poly (isoprene), polyterpenes, polyterpenoids, polyhydroxyalkanoates, rosin-based polymers, triglyceride-based polymers, alginates, and proteins of nature.

* * * * *